April 29, 1958  E. E. BIANCO  2,832,155
GAUGE SYSTEMS FOR CHECKING SCREWS AND SIMILAR ELEMENTS
Filed Dec. 6, 1955 2 Sheets-Sheet 1

INVENTOR:
EMILIO ERNESTO BIANCO
BY
Richardson, David and Nordon
HIS ATTY'S.

April 29, 1958 E. E. BIANCO 2,832,155
GAUGE SYSTEMS FOR CHECKING SCREWS AND SIMILAR ELEMENTS
Filed Dec. 6, 1955 2 Sheets-Sheet 2

INVENTOR:
EMILIO ERNESTO BIANCO
BY
Richardson, David and Nordon
HIS ATTYS.

United States Patent Office 2,832,155
Patented Apr. 29, 1958

2,832,155
GAUGE SYSTEMS FOR CHECKING SCREWS AND SIMILAR ELEMENTS

Emilio E. Bianco, Buenos Aires, Argentina

Application December 6, 1955, Serial No. 551,443

1 Claim. (Cl. 33—199)

This invention relates to a gauge system for checking screws and similar elements, and more particularly to a gauging device with which the gauging operation is carried out in a minimum of time, compared with the commonly used means. Although the use for which the device was originally created was that of checking threaded rods of all kinds, it was found also useful for pinions, striated shafts, and, in general, for a rapid check of the diametral measures of any moulded or profiled element.

The control of the above elements is usually made by means of devices having the shape of a horseshoe or similar shapes, the open ends carrying a set of checking members which slide over the element to be controlled. These checking members are diametrically opposed to each other and can be adjusted over a certain range of diameters, but after they are adjusted on a definite measure, the apparatus is used as a "fixed gauge" for checking a whole set of identical elements.

The present invention relates particularly to gauges of the referred to type, but having certain intrinsic characteristics of a fundamental nature which provide marked difference from the common ones, these characteristics widening their uses by an improved range of checking members, which at the same time provide a more economical construction of the assembly.

The gauging device of my invention comprises the usual frame or body shaped as a U, so as to allow the passage of the elements to be checked. Near the open end of the body there are at least two opposed holes made in the inner faces of the branches, and which lodge and support the checking members. These holes pass completely through the branches, and in the ends opposite to the ones lodging the checking members, there are adjusting means placed so as to abut against the inner ends of said checking members, while laterally with regards to each member, locking means are placed for maintaining the members in the desired fixed position. Each checking member comprises a cylindrical body having one end surface threaded according to the profile of the element to be checked. When the checking members are placed in position, in their respective orifices, they become coaxially opposed so that when finally adjusted, their threaded end surfaces come into loose contact with the element to be checked. The amount of play is set according to the permissible tolerance allowed in each case.

The profiled contact surfaces of each pair of elements correspond to the external surface of an ideal profiled or threaded solid of revolution, the generating position being the reverse to the one shown when the members are placed in the gauging device, or in other words, when the members are placed for threading or building up the profiled contact surfaces, they are coaxially placed in a perpendicular manner with regard to the ideal rotational axis of the solid of revolution, the contact surfaces being diametrically opposed by said axis and external regarding said solid. If the contact surfaces pertain to a screw, as is commonly the case in gauging devices for screws or similar elements, both sectors of a same pair, opposed in the generation of a profile, are displaced exactly by half a pitch with regard to each other, and if the screw is of a pair member of multiple threads, the real half-pitch displacement is coincident with the apparent pitch. It is preferable that in the generation of the profile, as well as in the assembly of the device, the fixing means operate always on the same side and in the direction of development of the profile, so that any movements of the member with regard to the axis of the orifice by any eventual play, are reduced to a minimum and, furthermore, compensated.

For differential control of screws or similar elements, the device usually carries a double set of the elements described, parallelly placed with regard to each other, one set being for checking the "maximum" tolerance and the other set for checking the "minimum" tolerance. The elements that are within the tolerance limits "go" through the first set of contact surfaces, but are "retained" by the second set. However, it may be sometimes convenient to place each set in a separate frame.

In the special case of conical screws, the nominal diameter of which measured at a definite axial section of the element, the difference in diameter causes the screw to penetrate farther or less into the nut, and, therefore, the differential control can be made by having two different transversal reference planes, one for each checking member, separated a fixed distance, which corresponds to the axial projection of the tolerated diameter difference for the element. In this case the correct element "goes" through, sliding with its smaller end in coincidence with one of said planes, but is "retained" when the end is placed in correspondence with the other plane. This is the reason why the gauging devices for conical screws need have only one set of contact surfaces.

In the case of toothed wheels, pinions or the like, the contact surfaces of the device are not the reverse replica of the surface to be checked, but represent the ideal generating rack of the element, the teeth of the checking members making contact with the sides only of the diametrically opposed teeth of the element.

All these gauges are adjusted and aligned carrying the checking surfaces into contact with a master element that has the form and limit size for the standard elements. During this operation, the surface of the sectors is adjusted to the master, each falling automatically into the correct position. This is the reason why trimming members that are sometimes added to the contact members, can be, in the present case, dispensed with, by giving a circular section to the body of the checking members, and to the retention elements, a shape capable of securing the members in any given position, after the adjustment steps are ended.

It is an important condition for the retention elements, that when they operate on the checking members, the latter are pushed against their respective abutments, so as to avoid all possibility of axial movement. It is also important that the retention element may be plastically adjusted against the body of the checking members, maintaining, furthermore, a considerable elastic tension, which guarantees that the securing effort is maintained always constant.

I will now give a more detailed description of the invention, with reference to the accompanying drawings, in which.

The device comprises a frame or body 1, substantially in the form of a U having two symmetrical arms, in one of which there are two transverse orifices 2 and 3 and in the other, two transverse orifices 2' and 3'. These orifices lodge the cylindrical bodies 4 of checking members A, B, C and D, which are placed with their profiled contact ends 5', 5, 6, 6', respectively, directed towards the inner part of the U. Towards the external end of each of the transverse orifices 2, 2'; 3 and 3' there is a threaded zone 7, in which a screw 7' is carried. This screw 7' acts as an adjusting and abutting means for the checking members.

Figure 1:
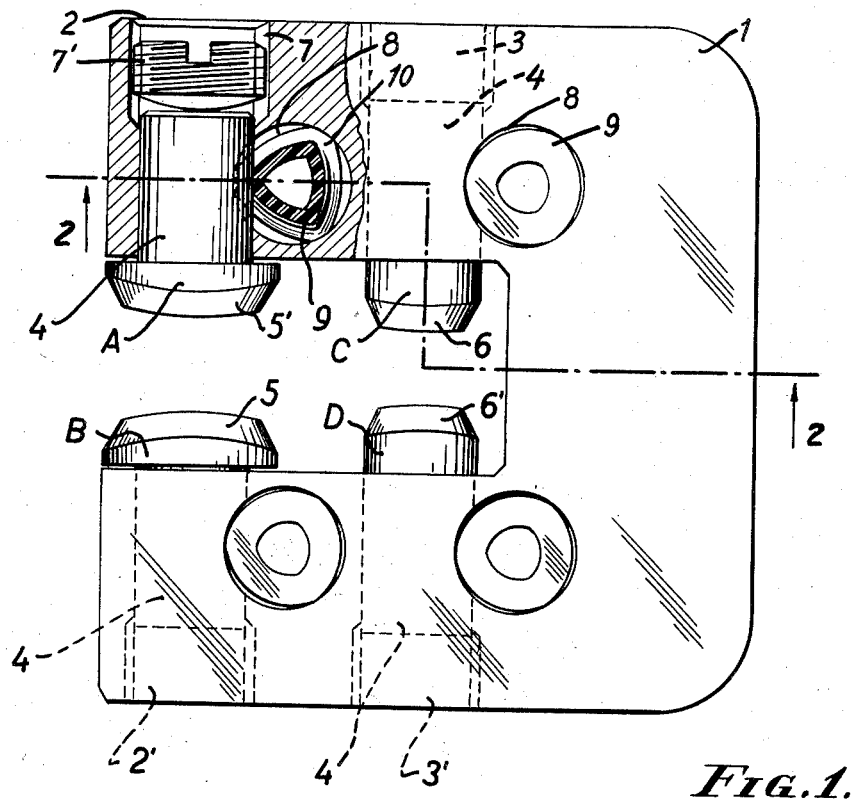
Fig. 1 is a partially sectional plan view of the complete device, for the differential control of cylindrical screws.
Figure 2:
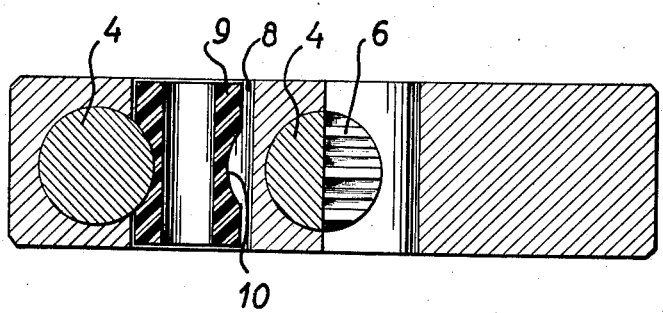
Fig. 2 is a sectional view along line 2—2 of Fig. 1.

Perpendicular to the orifices 2, 2'; 3 and 3' there are orifices 8, which partially intersect them, and in which the locking members 9 are placed, these members each consisting of a small tube of mixtilinear polygonal cross-section with a transverse groove 10 (Fig. 2) the curvature of which corresponds to the radius of the body 4 to be locked. A preferred shape for the cross-section of these locking members is that of a triangle of curved sides, the groove 10 also following closely this shape, so that, by axial rotation the locking member functions as a cam against the body, the material of the locking member being such that it becomes partially plastically and partially elastically deformed, thereby firmly securing the body 4 and simultaneously resting against the sides of its own orifice 8, providing thus an exact and constant lock for the checking elements. A suitable material for this purpose, for example, is a synthetic resin or similar plastic having the above characteristics.

Figures 3, 4, 5:
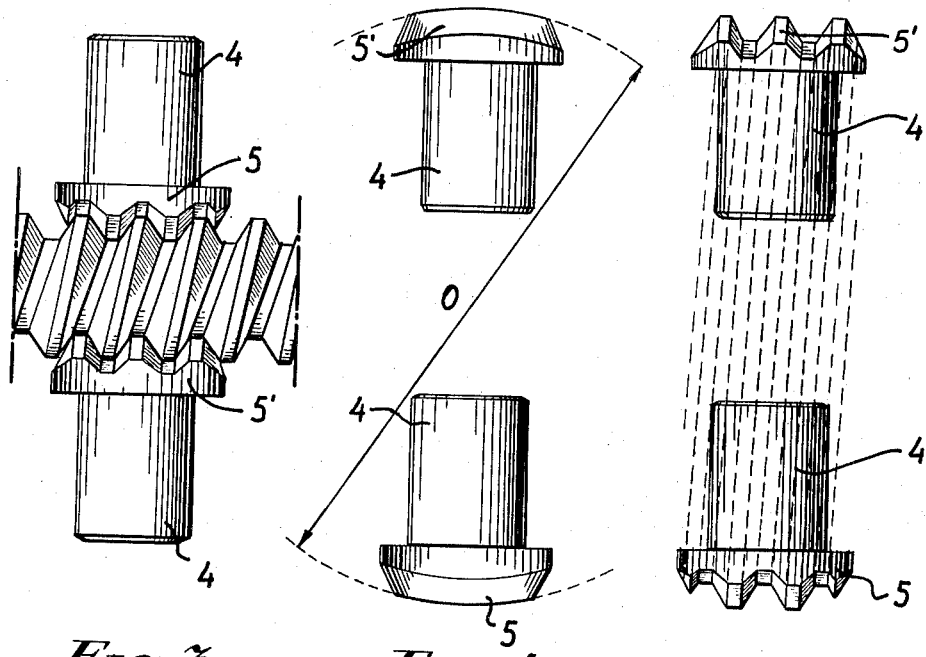
Fig. 3 is a partial front view showing the manner in which a pair of contact members operate over a cylindrical screw to be checked.
Fig. 4 is a partially detail view demonstrative of the manner in which the profile is generated in a pair of contact members.
Fig. 5 is the side view corresponding to Fig. 4.

The contact surfaces are constructed by placing members A and B, for example, in a reverse position to the position they will occupy in the gauging device, that is to say, with the profiled contact ends of the bodies 4 facing each other so that the contact ends 5 and 5' are opposed and coincident with the external surface of an ideal body of revolution with diameter "0" (Figs. 4 and 5). The checking members are thus placed and securely positioned in a suitable carrier device, and thereafter simultaneously threaded over said external diameter "0." Once the contact surfaces are correctly profiled, they are cross-wise transferred to the gauging device, the bodies 4 being slid into their respective orifices 2 and 2', the locking elements 9 being previously rotated so that one of the faces of the tubes is placed substantially parallel to the axis of the orifices so as to allow the free passage of the bodies 4 into the orifices.

The above description reads on the construction of the checking members for the "go" through gauge, but the same steps are followed for constructing the "retain" checking members C and D, the only difference being that for the latter, the contact ends or heads may have the same diameter as the body 4, instead of being of greater size, such as shown in the drawings for members A and B.

For the adjustment of the device, a set of master gauges is needed for each size of element to be checked, one gauge for the "go" through size, and another for the "retain" size. The master gauge, having the form of a screw (Fig. 3), pinion, etc., similar to the elements to be checked, but having the higher—or lower—tolerance limit allowed, is placed between the contact surfaces, so that the corresponding profiles engage the threads of the contact surfaces and assume the correct slant. By operating on abutting screws 7' the members are carried into close contact with the master gauge, so that the latter first passes through them by its own weight, or equivalent force. Once this end is reached, locking means 9 are each rotated thereby forcing body 4 against the abutting screw 7' and simultaneously firmly securing it. By its triangular cross section the locking means 9 functions as a cam, being firmly adjusted between the body 4 and the walls of its own orifice 8. Finally, and after the adjusting operations are completed, the mouths of the orifices containing the elements are conveniently sealed so as to avoid any alteration or displacement in the position of the checking members.

Figures 6, 7:
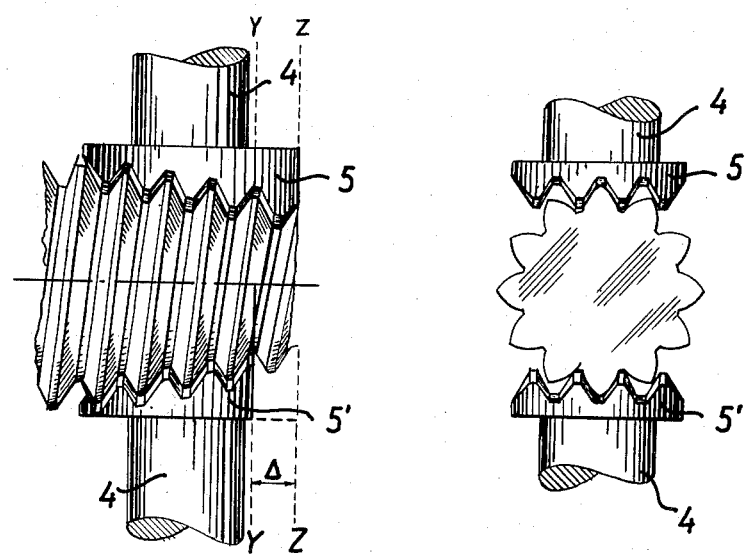
Fig. 6 is a partially frontal view showing the characteristics of a pair of contact members for conical screws, and showing the manner in which said members operate on the conical screw to be checked.
Fig. 7 is a partially frontal view demonstrative of the manner in which a pair of contact members, profiled as a generating rack, operate over a pinion to be checked.

In the particular case of conical screws, in which the nominal diameter is taken at a certain predetermined axial section the differences in diameter result in that the screw goes into the nut to a greater or lesser degree, and therefore, the differential control can be carried out by taking on each of the two members of the checking means, a different reference plane Y—Y and Z—Z (Fig. 6) separated by a distance Δ, corresponding to the axial projection of the allowed diameter difference for the element under control. In this case, the correct element "goes" through, passing with its smaller end in coincidence with plane Y—Y but is "retained" when in coincidence with plane Z—Z. This is the reason why the checking gauges for conical screws need only one pair of contact members.

When toothed wheels, pinions, striated shafts or similar elements are to be checked (Fig. 7), the profile of the contact surfaces is not the reverse replica of the element to be checked, but it represents the ideal rack which generates the element, or in other words, the contact is made only in the sides of the diametrically opposed teeth. The striated shafts are passed end-on through the first set of checking members, and are retained by a second set of similar members.

Several embodiments in which the basic inventive idea is contained can, of course be made within the scope of the invention, which is duly limited in the following claim.

I claim:

A gauging device for checking tolerances in externally threaded, toothed or striated elements, of the type in which a frame substantially in the form of a U carries two sets of two adjustable opposed checking members mounted in corresponding orifices in the opposed branches of the frame and locking means for maintaining said members in a fixed position, the checking members having contact ends of conjugate shape with regard to the element to be gauged, and spaced apart a distance giving the maximum diametrical tolerance of said element, said checking members being elongated by cylindrical bodies rotatably fitted in said corresponding orifices, said locking means being lodged in orifices perpendicular to and partially intersecting the orifices lodging the checking members, the locking means being constituted by small tubes of substantially triangular cross-section, with curved sides, each side having a curved grooved zone to correspond with the radius of curvature of the body of the respective checking member, said tubes each being of a material elastically deformable, when by axial rotation one of its apices enters into pressurized contact with the body of the adjacent checking member, whereby said checking member is firmly and frictionally locked in position.

References Cited in the file of this patent

UNITED STATES PATENTS

| | | |
|---|---|---|
| 1,200,947 | Johansson | Oct. 10, 1916 |
| 1,307,426 | Wells | June 24, 1919 |
| 1,669,873 | Hoagland | May 15, 1928 |
| 1,817,637 | Miller | Aug. 4, 1931 |
| 2,611,970 | Johnson | Sept. 30, 1952 |

FOREIGN PATENTS

| | | |
|---|---|---|
| 382,495 | Great Britain | Oct. 27, 1932 |
| 887,213 | France | Nov. 8, 1943 |